(12) United States Patent
Tsuchiya

(10) Patent No.: US 11,798,584 B2
(45) Date of Patent: Oct. 24, 2023

(54) BEARING DEVICE WITH PRE-LOAD CONFIGURATION, METHOD FOR PRODUCING SAME, AND HARD DISK DRIVE DEVICE

(71) Applicant: MINEBEA MITSUMI Inc., Nagano (JP)

(72) Inventor: Kunihiro Tsuchiya, Gunma (JP)

(73) Assignee: MINEBEA MITSUMI Inc., Nagano (JP)

( * ) Notice: Subject to any disclaimer, the term of this patent is extended or adjusted under 35 U.S.C. 154(b) by 17 days.

(21) Appl. No.: 17/656,910

(22) Filed: Mar. 29, 2022

(65) Prior Publication Data

US 2022/0319545 A1    Oct. 6, 2022

(30) Foreign Application Priority Data

Apr. 1, 2021    (JP) .................................. 2021-062653

(51) Int. Cl.
  *G11B 5/48*    (2006.01)
  *F16C 19/54*    (2006.01)
  *F16C 25/08*    (2006.01)

(52) U.S. Cl.
  CPC ............ *G11B 5/4813* (2013.01); *F16C 19/54* (2013.01); *F16C 25/083* (2013.01); *F16C 2370/12* (2013.01)

(58) Field of Classification Search
  None
  See application file for complete search history.

(56) References Cited

U.S. PATENT DOCUMENTS

| 6,490,138 | B1 * | 12/2002 | Prater | .................. | G11B 5/5521 |
|           |      |         |        |                    | 360/294.3 |
| 8,221,003 | B2   | 7/2012  | Smith et al. | | |
| 2002/0167762 | A1 * | 11/2002 | Kan et al. | ............ | G11B 5/4813 |
|           |      |         |        |                    | 360/265.2 |
| 2009/0245712 | A1 | 10/2009 | Smith et al. | | |

FOREIGN PATENT DOCUMENTS

JP    2009-243555    10/2009

* cited by examiner

*Primary Examiner* — Craig A. Renner
(74) *Attorney, Agent, or Firm* — Pearne & Gordon LLP

(57) ABSTRACT

There is provided a bearing device including: a tubular sleeve; a shaft held inside the sleeve; and a first bearing, a second bearing, a third bearing, and a fourth bearing, rotatably holding the shaft with respect to the sleeve and arranged in this order in an axial direction. An outer circumferential surface of an outer ring of each of the first to fourth bearings is fixed to an inner circumferential surface of the sleeve, a gap is provided between inner circumferential surfaces of inner rings of the second and third bearings and the shaft, and a spring applying a constant pre-load is provided between the inner rings of the second and third bearings.

19 Claims, 6 Drawing Sheets

BEARING DEVICE WITH PRE-LOAD CONFIGURATION, METHOD FOR PRODUCING SAME, AND HARD DISK DRIVE DEVICE

CROSS REFERENCE TO RELATED APPLICATIONS

This application claims the benefit of priority to Japanese Patent Application Number 2021-062653 filed on Apr. 1, 2021. The entire contents of the above-identified application are hereby incorporated by reference.

TECHNICAL FIELD

The present disclosure relates to a bearing device suitable for use in, for example, a pivot assembly bearing device of a magnetic disk drive device, and particularly relates to a bearing device having a low rotational torque variation and a high rigidity.

BACKGROUND

An actuator for moving a magnetic head used for data reading and writing on a disk of a hard disk drive device is rotatably supported by, for example, a pivot assembly bearing device with two bearings spaced apart in the axial direction.

In recent years, there has been a demand for further improvement in the positioning accuracy of a magnetic head moving on a disk by an actuator, and thus the number of bearings of a bearing device has been increased to improve rigidity and increase radial rigidity, so that it is possible to improve the positioning accuracy of the magnetic head.

For example, JP 2009-243555 A discloses a bearing device using four bearings. In this bearing device, in order to suppress torque variation, an inner ring or an outer ring of an inner bearing of the four bearings is disposed with a gap in the radial direction between the ring and a shaft or a sleeve.

SUMMARY

However, in a case where a gap in the radial direction is provided between inner rings of two central roller bearings and the shaft in JP 2009-243555 A, it is difficult to precisely control a position of a spacer in the radial direction, and it is not possible to stably apply a pre-load to the roller bearings with ease. In particular, when a gap is formed between a rotating sleeve and an outer ring, it is not possible to sufficiently increase the radial rigidity. Furthermore, when the number of bearings is increased, the pre-load may not be uniform at upper and lower bearings depending on the assembly method. For example, in JP 2009-243555 A, the pre-load is applied in such a manner that bearings are stacked in the sleeve from the lower side, and when a pre-load is applied to an upper bearing, a load is also applied to a lower bearing already preloaded. As a result, the pre-load state of the lower bearing may change, leading to a torque variation.

In light of the above circumstances, an object of the present disclosure is to provide a bearing device capable of not only increasing a radial rigidity, but also applying a uniform pre-load to each bearing by applying a constant pre-load to an inner bearing, so that it is possible to suppress a torque variation and further improve accuracy.

An aspect of the present disclosure is a bearing device including: an outer member having a tubular shape; a shaft member held inside the outer member; and a first bearing, a second bearing, a third bearing, and a fourth bearing rotatably holding the shaft member with respect to the outer member and arranged in this order in an axial direction, wherein an outer circumferential surface of an outer ring of each of the first bearing, the second bearing, the third bearing, and the fourth bearing is fixed to an inner circumferential surface of the outer member, and a spring applying a constant pre-load is provided between inner rings of the second bearing and the third bearing.

In the bearing device having the above-described configuration, a constant pre-load is applied to the second bearing and the third bearing, and thus the inner rings are not fixed to the shaft member. In other words, the inner rings are movable in the axial direction, and a uniform pre-load is applied to the second bearing and the third bearing. In addition, a pre-load equivalent to the pre-load applied to the second and third bearings can be applied to the first and fourth bearings by an appropriate means. As a result, according to the present disclosure, it is possible to increase the radial rigidity, as well as to apply a uniform pre-load to the first to fourth bearings, so that torque variation can be suppressed and accuracy further improved.

A sealing member may be provided between the inner ring of at least one of the second bearing and the third bearing and the shaft member. As a result, it is possible to suppress micro-vibration of a non-fixed inner ring and to suppress occurrence of wear and/or noise caused by friction with the shaft member.

The sealing member is desirably one having a low hardness such as an elastic adhesive. The hardness of the sealing member is Shore A 70 or less, more preferably A 50 or less. With the sealing member having such a hardness, even though the sealing member is in contact with an inner ring when a load due to torque variation is applied, the inner ring can move slightly, thus suppressing the torque variation. Note that as the sealing member, a solid lubricant such as molybdenum disulfide or a synthetic resin can also be used.

As a hard adhesive used at locations other than the location where the sealing member is used, an anaerobic adhesive including: urethane acrylate: 15% to 25%, acrylic acid diester: 45% to 55%, acrylic acid monomer: less than 3%, hydroxyalkyl methacrylate: 15% to 30%, an anaerobic catalyst: less than 3%, and a photopolymerization initiator: less than 3% can be used. This anaerobic adhesive is rapidly polymerized and cured in an air shut-off location like a gap between metals and is further cured by irradiation with ultraviolet light on a portion protruding from the gap, making the anaerobic adhesive excellent in workability, and because the amount of generated outgas is small, it is suitable for use in a pivot assembly bearing device of a magnetic disk drive device. Note that as an adhesive other than the ultraviolet curing type adhesive, a solvent evaporation type or chemical reaction curing type adhesive may be used.

An aspect of the present disclosure is a hard disk drive device including: a bearing device as described above; a swing arm swingably supported by the bearing device and configured to move a magnetic head on a magnetic disk; and a base plate having a shaft of the bearing device fixed to the base plate.

Next, another aspect of the present disclosure is a method for producing a bearing device including a shaft member rotatably held inside an outer member having a tubular shape via a first bearing, a second bearing, a third bearing, and a fourth bearing, the method including: inserting the third bearing into the outer member and adhering only an outer ring of the third bearing to an inner circumferential surface of the outer member; inserting a spring into the outer member to bring an end surface of the spring into contact with an inner ring of the third bearing; inserting the second bearing into the outer member, pressing an inner ring of the second bearing against the spring, and adhering only an outer ring of the second bearing to the inner circumferential surface of the outer member; inserting the first bearing into the outer member and adhering an outer ring of the first bearing to the inner circumferential surface of the outer member; adhering an inner ring of the fourth bearing to an outer circumferential surface of the shaft member; and inserting the shaft member into the inner rings of the first to third bearings, adhering an outer ring of the fourth bearing to the inner circumferential surface of the outer member, and adhering an inner ring of the first bearing to the outer circumferential surface of the shaft member.

In the method for producing a bearing device having the above-described configuration, the inner circumferential surfaces of the inner rings of the second bearing and the third bearing are not adhered to the shaft member, and thus the inner rings are movable in the axial direction. Furthermore, a spring applying a constant pre-load is provided between the inner rings, and thus a uniform pre-load is applied to the second bearing and the third bearing. As described above, according to the present disclosure, it is possible to increase the radial rigidity, as well as to apply a pre-load equivalent to the second bearing and the third bearing by an appropriate method to bearings at both ends, so that the torque variation can be suppressed to further improve positioning accuracy.

Here, the inner rings of the second bearing and the third bearing can be adhered to the outer circumferential surface of the shaft member with an elastic adhesive. As a result, it is possible to suppress micro-vibration of a non-fixed inner ring and to suppress occurrence of wear and/or noise caused by friction with the shaft member.

According to the present disclosure, it is possible to increase the radial rigidity by using the first to fourth bearings, as well as to suppress torque variation and further improve positioning accuracy.

DESCRIPTION OF EMBODIMENTS

1. Hard Disk Drive Device

Figure 1:
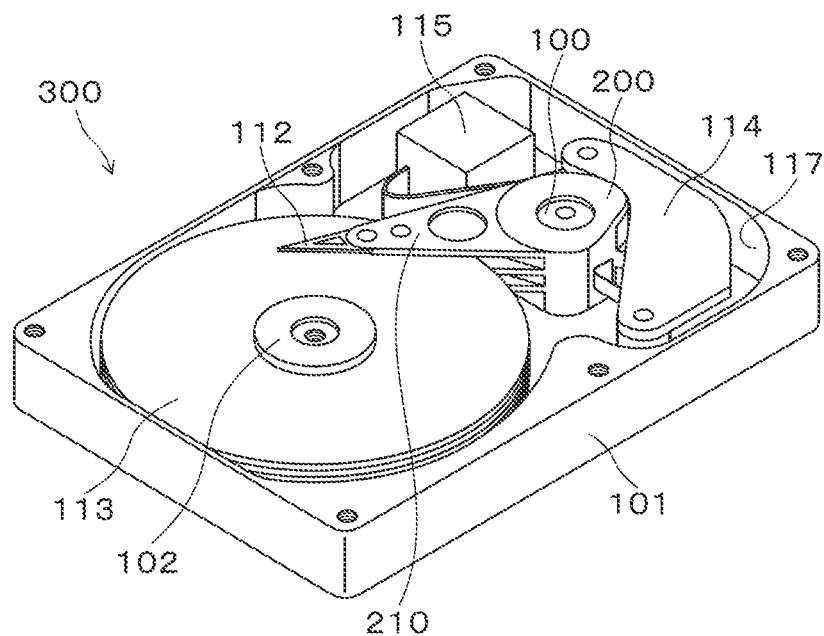
FIG. 1 is a perspective view illustrating a hard disk drive device according to an embodiment of the present disclosure.

FIG. 1 is a perspective view illustrating an overall configuration of a hard disk drive device 300 using a spindle motor, according to an embodiment of the present disclosure. As illustrated in the figure, the hard disk drive device 300 includes a base 101 having a recess 117, and a spindle motor 102 and a plurality of hard disks 113 attached to the spindle motor 102 and configured to rotate are disposed in the recess 117. In addition, a swing arm assembly 200 provided with a swing arm 210 supporting a plurality of magnetic heads 112 each facing a corresponding one of the hard disks 113, an actuator 114 configured to drive the swing arm 210, and a control unit 115 configured to control these units are disposed in the recess 117. Note that a cover is attached to an upper surface of the base 101 to hold the recess 117 in an airtight manner, but the cover is omitted in FIG. 1. A low-density gas such as helium is sealed in the recess 117.

2. Swing Arm Assembly

Figure 2:
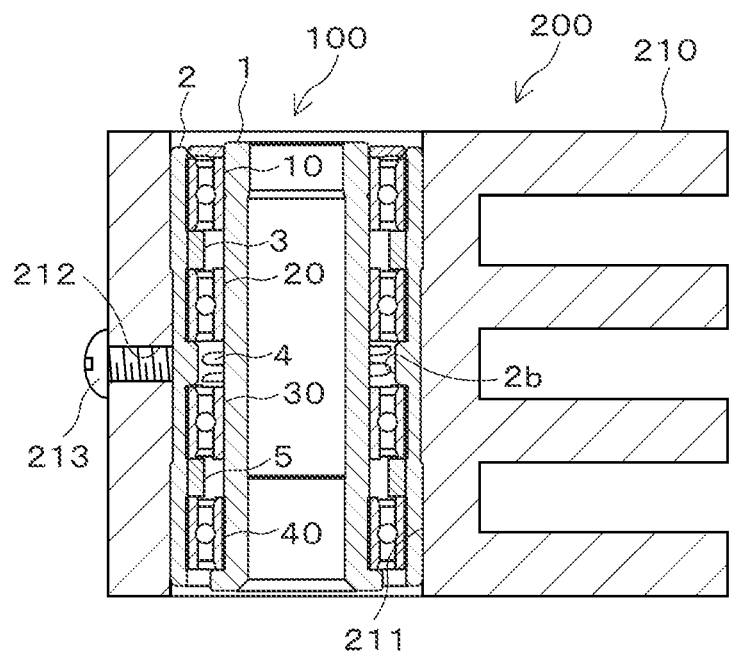
FIG. 2 is a cross-sectional view illustrating an overview of a swing arm assembly for a magnetic disk utilizing a pivot assembly bearing device according to the embodiment.

FIG. 2 is a view illustrating the swing arm assembly 200. The swing arm assembly 200 has a structure using a pivot assembly bearing device 100 described below to hold the swing arm 210 in a rotatable state in the hard disk drive device 300. The swing arm 210 in the hard disk drive device 300 swings minutely at a high speed and is highly required to have high-speed access to a target track and positioning accuracy. For this reason, the pivot assembly bearing device 100 is required to have a high accuracy. In addition, movement of the swing arm 210 is affected by the resonance frequency of the pivot assembly bearing device 100, and thus a smaller deviation in the frequency of the pivot assembly bearing device 100 is required. Furthermore, a structure minimizing torque variation generated when attaching the swing arm 210 to the pivot assembly bearing device 100 is desired.

A through hole 211 is provided in a shaft portion of the swing arm 210. The pivot assembly bearing device 100 illustrated in FIG. 3 is fitted into the through hole 211. The portion corresponding to reference sign 212 is a screw hole reaching the through hole 211. In a state where the pivot assembly bearing device 100 is fitted into the through hole 211 of the swing arm 210, a screw 213 is threaded into the screw hole 212 and tightened to attach the swing arm 210 to the pivot assembly bearing device 100.

At this time, a tip of the screw 213 comes into contact with the pivot assembly bearing device 100. A contact position of the screw 213 with the pivot assembly bearing device 100 is a step portion 2b of a sleeve 2. The step portion 2b is thick and has a high rigidity, and deformation of an outer ring of a bearing of the pivot assembly bearing device 100 and deformation of an orbital groove shape of the outer ring by tightening of the screw 213 are unlikely to occur, so that it is possible to suppress a torque variation caused by the deformation. In other words, torque variation of the pivot assembly bearing device 100 caused by tightening of the screw 213 is unlikely to occur.

3. Bearing Device

Figure 3A:
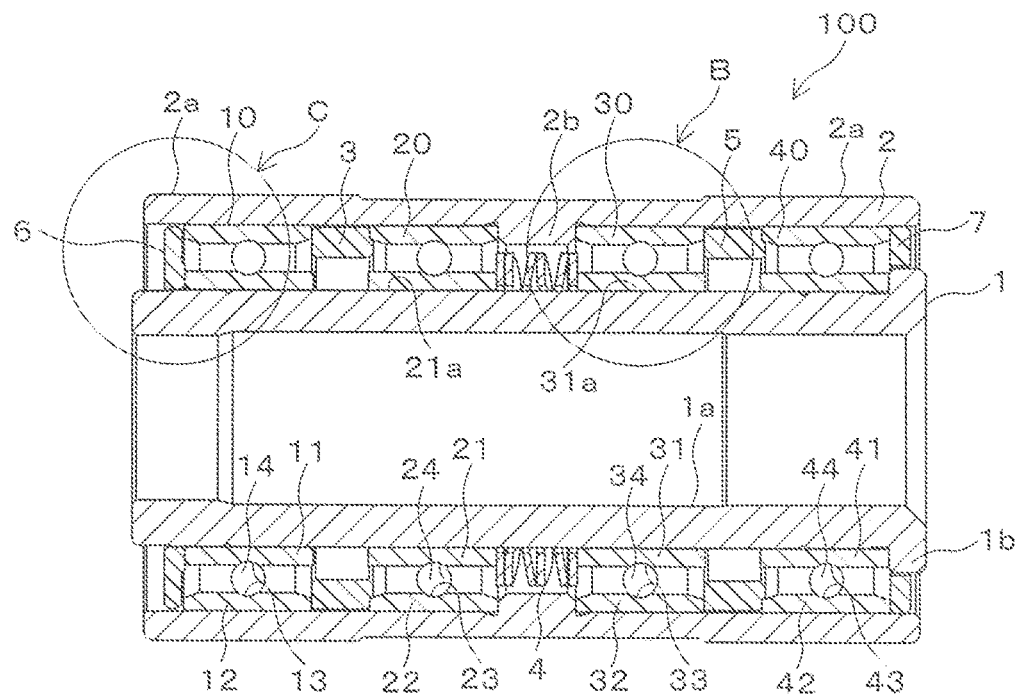
FIG. 3A is a cross-sectional view illustrating an overview of the pivot assembly bearing device according to the embodiment.
Figure 3B:
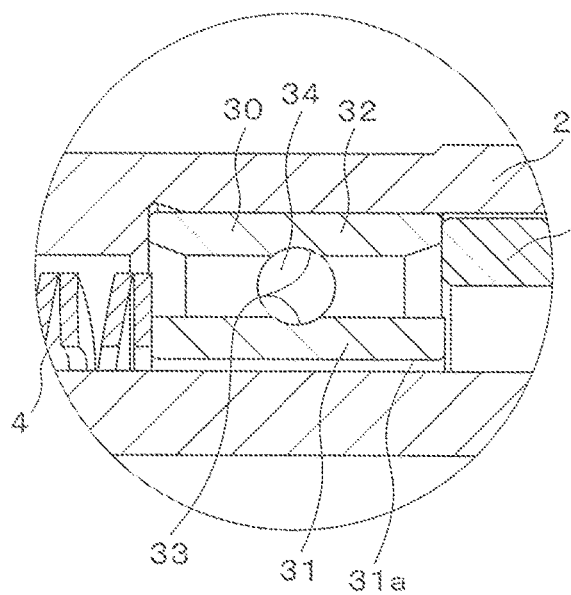
FIG. 3B is an enlarged view of a portion indicated by arrow B in FIG. 3A.
Figure 3C:
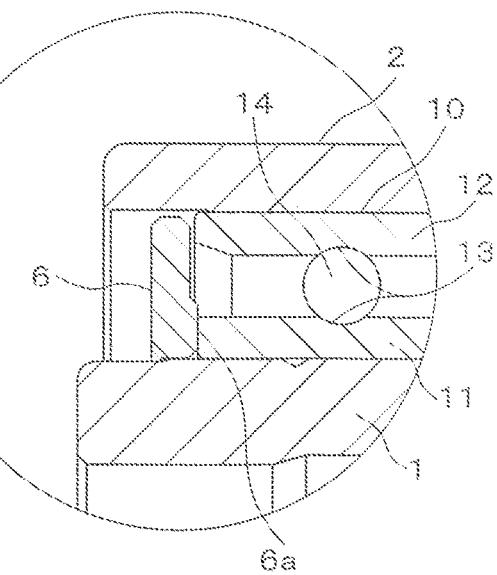
FIG. 3C is an enlarged view of a portion indicated by arrow C in FIG. 3A.

FIGS. 3A to 3C illustrate the pivot assembly bearing device 100 according to the embodiment. The pivot assembly bearing device 100 supports a rotation shaft of the swing arm 210 having the magnetic head 112 of the hard disk drive device 300 attached at the tip. A through hole (or female screw) la is provided in a central portion of a shaft (shaft member) 1, and the shaft 1 is fixed to the base 101 of the hard disk drive device 300 using the through hole 1a. Further, a flange 1b protruding outward in the radial direction is formed at one end of the shaft 1.

In the shaft 1, a sleeve (outer member) 2 having a cylindrical shape is held in a rotatable state by a first bearing 10, a second bearing 20, a third bearing 30, and a fourth bearing 40 spaced apart in the axial direction. Fitting portions (or male helical portions) 2a each having a diameter larger than that of other portions are formed at respective outer circumferences of the sleeve 2 at both ends, the swing arm 210 is attached to the fitting portions 2a, and the swing arm 210 can rotate around the shaft 1.

The first bearing 10 is formed by disposing balls 14 at equal intervals in a circumferential direction by using a retainer (not illustrated) in an orbital groove 13 formed in an outer circumferential surface of an inner ring 11 and an inner circumferential surface of an outer ring 12. Note that the bearings 20 to 40 are formed in the same manner as the bearing 10, and thus the same reference sign is assigned to the first digit of the reference signs of the components, and the description will be omitted. Furthermore, a shield (not illustrated) preventing grease leakage is attached to both ends of the first to fourth bearings 10 to 40.

A spacer 3 is interposed between the first bearing 10 and the second bearing 20. The spacer 3 is formed into a ring shape and has both end surfaces in contact with the outer ring 12 of the first bearing 10 and an outer ring 22 of the second bearing 20. The step portion 2b protruding inward in the radial direction is formed in a central portion of an inner circumferential surface of the sleeve 2. The outer ring 22 of the second bearing 20 and an outer ring 32 of the third bearing 30 are in contact with the step portion 2b. A compression spring (spring) 4 is disposed inside the step portion 2b of the sleeve 2. The compression spring 4 is in a compressed state in FIG. 1, and presses an inner ring 21 of the second bearing 20 and an inner ring 31 of the third bearing 30 in a direction separating the inner ring 21 and the inner ring 31 from each other. Note that, as the compression spring 4, a spring made of metal such as a compression coil spring, a coiled wave spring, or a wave washer, or a spring made of resin formed by molding rubber, urethane resin, or the like into a tubular shape can be used.

A spacer 5 is interposed between the third bearing 30 and the fourth bearing 40. The spacer 5 is formed into a ring shape and has both end surfaces in contact with the outer ring 32 of the third bearing 30 and an outer ring 42 of the fourth bearing 40. As illustrated in FIG. 3C, a hub cap 6 is in contact with an end surface of the inner ring 11 of the first bearing 10. A boss 6a protruding in the axial direction is formed at the inner circumferential side of an end surface of the hub cap 6, and the boss 6a presses against the inner ring 11. The hub cap 6 has a function of applying a pre-load to the first bearing 10 and the fourth bearing 40 and preventing grease leakage from the first bearing 10. In addition, a hub cap 7 coming into contact with the outer ring 42 of the fourth bearing 40 is attached to an opening portion of the sleeve 2 opposite to the hub cap 6. The hub cap 7 has a function of preventing grease leakage from the fourth bearing 40.

The outer circumferential surfaces of the outer rings 12 to 42 of the first to fourth bearings 10 to 40 are adhered to the inner circumferential surface of the sleeve 2. The inner circumferential surfaces of the inner rings 11, 41 of the first and fourth bearings 10, 40 are adhered to the outer circumferential surface of the shaft 1. On the other hand, the inner circumferential surfaces of the inner rings 21, 31 of the second and third bearings 20, 30 are not adhered to the outer circumferential surface of the shaft 1. Due to this, as illustrated in FIG. 3B, a gap 31a is formed between the inner circumferential surface of the inner ring 31 of the third bearing 30 and the outer circumferential surface of the shaft 1. Note that although the gap 31a illustrated in FIG. 3B is described as being large for the purpose of illustration, it is actually little more than a gap fit or a transition fit and is from 0 to several μm (less than 10 μm), for example. In addition, a gap 21a equivalent to the gap 31a is also formed between the inner circumferential surface of the inner ring 21 of the second bearing 20 and the outer circumferential surface of the shaft 1 (see FIG. 3A).

4. Assembling Method of Bearing Device

Figure 4A:
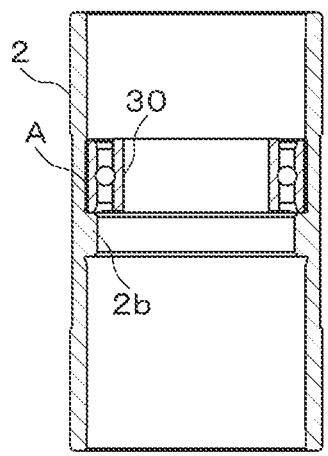
FIGS. 4A to 4F are cross-sectional views illustrating a method for assembling the pivot assembly bearing device according to the embodiment.

An assembling method of the pivot assembly bearing device 100 having the above-described configuration will be described with reference to FIGS. 4A to 4F and FIGS. 5G to 5K. First, as illustrated in FIG. 4A, the sleeve 2 is placed vertically, an adhesive A is applied to the inner circumferential surface of the sleeve 2 in the vicinity of the step portion 2b, and the third bearing 30 is lightly press-fitted by a press-fitting jig having a cylindrical shape into the sleeve 2 to be inserted into the location of the adhesive A. As a result, the adhesive A is interposed between the outer ring 32 of the third bearing 30 and the inner circumferential surface of the sleeve 2. Note that the adhesive A is a hard adhesive such as an anaerobic adhesive.

Figure 4B:
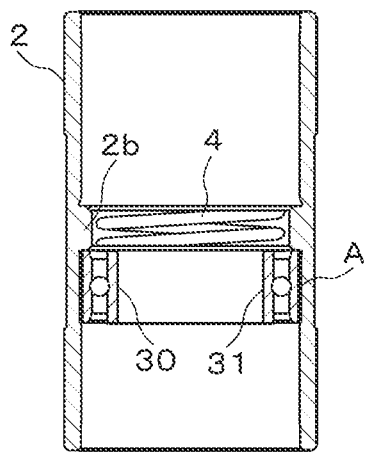
Figure 4C:
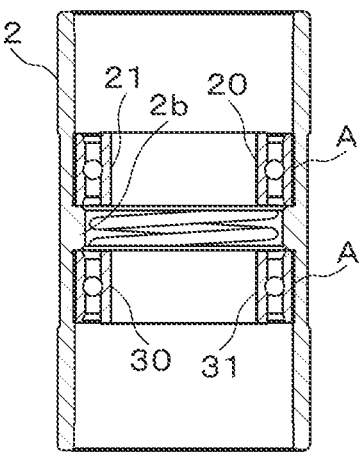

The sleeve 2 is flipped vertically, the compression spring 4 is inserted into the sleeve 2, the compression spring 4 is placed on the inner ring 31 of the third bearing 30, and the compression spring 4 is positioned inside the step portion 2b (see FIG. 4B). In this state, an upper end portion of the compression spring 4 protrudes slightly upward from the step portion 2b. Next, the adhesive A is applied to the inner circumferential surface of the sleeve 2 in the vicinity of the step portion 2b, and the second bearing 20 is lightly press-fitted by a press-fitting jig having a cylindrical shape into the sleeve 2 to be inserted into the location of the adhesive A (see FIG. 4C). At this time, the second and third bearings 20, 30 are compressed so as to come into contact with the step portion 2b by the upper and lower press-fitting jigs, and held until the adhesive A is cured. Then, when the upper and lower press-fitting jigs are removed from the sleeve 2, the inner rings 21, 31 of the second and third bearings 20, 30 move in a direction separating the inner rings 21, 31 from each other by elastic recovery of the compression spring 4, and a pre-load is applied to the second and third bearings 20, 30. Note that a washer such as a flat washer may be present between the compression spring 4, and the second bearing 20 and the third bearing 30.

Figure 4D:
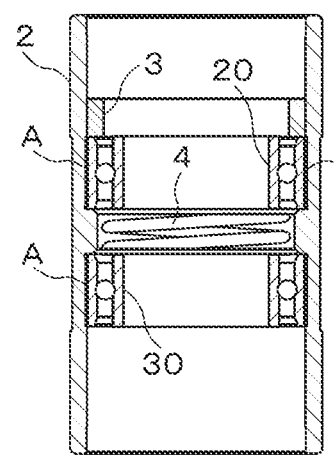

Next, the spacer 3 is inserted into the sleeve 2 from above and is brought into contact with the end surface of the outer ring 21 of the second bearing 20 (see FIG. 4D). Next, the adhesive A is applied to the inner circumferential surface of the sleeve 2 in the vicinity of the spacer 3, and the first bearing 10 is lightly press-fitted into the sleeve 2 by a press-fitting jig to be brought into contact with the spacer 3. Then, the adhesive A is cured to bond the outer ring 12 of the first bearing 10 to the inner circumferential surface of the sleeve 2 (see FIG. 4E).

On the other hand, the adhesive A is applied to the outer circumferential surface of the shaft 1 in the vicinity of the flange 1b, and the shaft 1 is inserted into the fourth bearing 40 to bring the fourth bearing 40 into contact with the flange 1b. Then, the adhesive A is cured to bond the inner ring 41 of the bearing 40 to the outer circumferential surface of the shaft 1 (see FIG. 4F). Note that the shaft 1 and the fourth bearing 40 are gap-fitted.

Figure 4E:
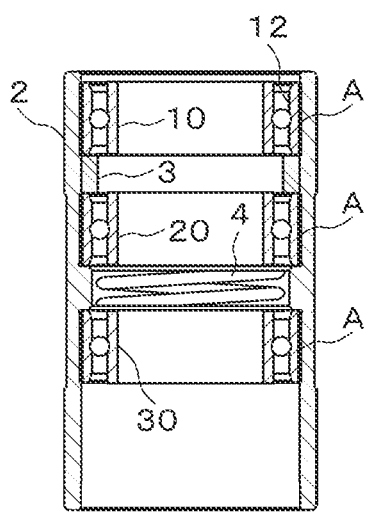
Figure 4F:
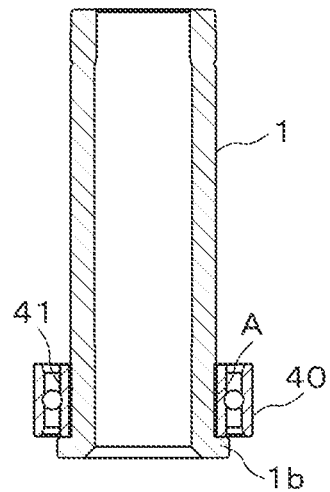
Figure 5G:
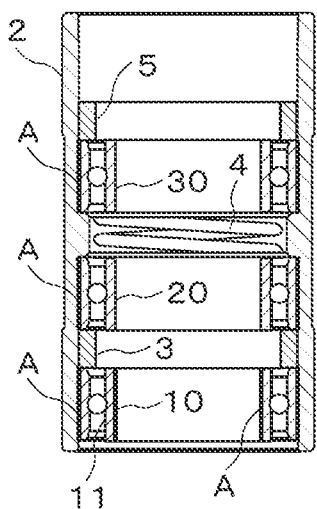
FIGS. 5G to 5K are cross-sectional views illustrating the method for assembling the pivot assembly bearing device according to the embodiment.
Figure 5H:
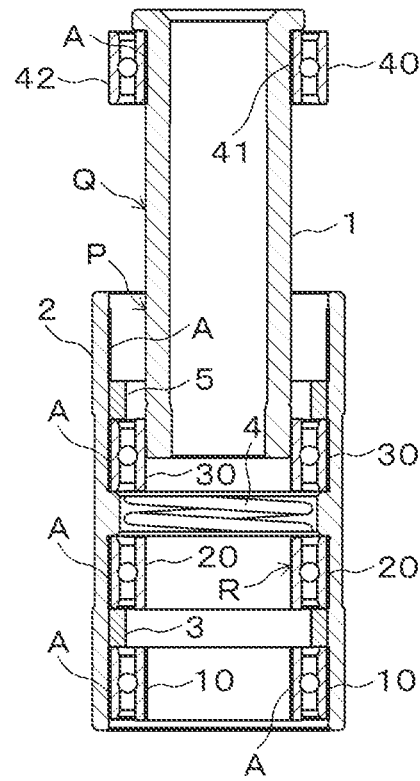

The sleeve 2 is flipped vertically from the state illustrated in FIG. 4E, and as illustrated in FIG. 5G, the adhesive A is applied to the inner circumferential surface of the inner ring 11 of the first bearing 10. In addition, the spacer 5 is inserted into the sleeve 2 to be brought into contact with the end surface of the third bearing 30. Next, as illustrated in FIG. 5H, the adhesive A is applied to the vicinity of the upper end portion of the inner circumferential surface of the sleeve 2, the shaft 1 is inserted into the third bearing 30, the second bearing 20, and the first bearing 10, in this order, and the end surface of the outer ring 42 of the fourth bearing 40 is brought into contact with the spacer 5 (see FIG. 5I). As a result, the adhesive A is interposed between the inner ring 11 of the first bearing 10 and the outer circumferential surface of the shaft 1, and the adhesive A is interposed between the outer ring 42 of the fourth bearing 40 and the inner circumferential surface of the sleeve 2.

Figure 5I:
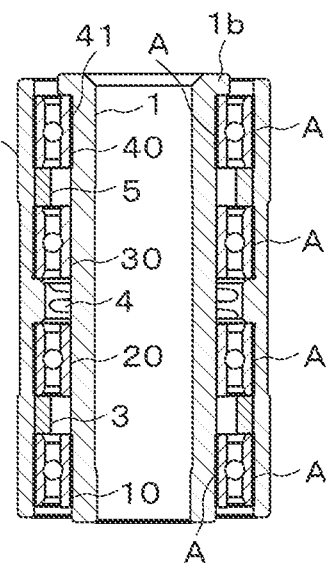
Figure 5J:
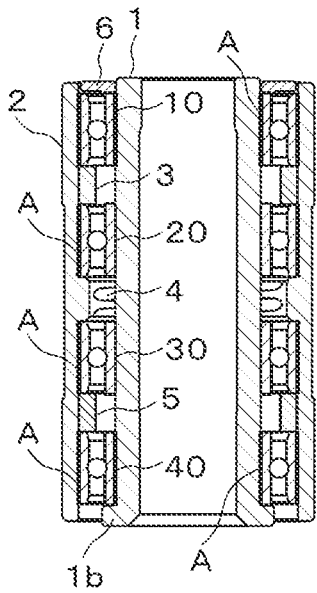
Figure 5K:
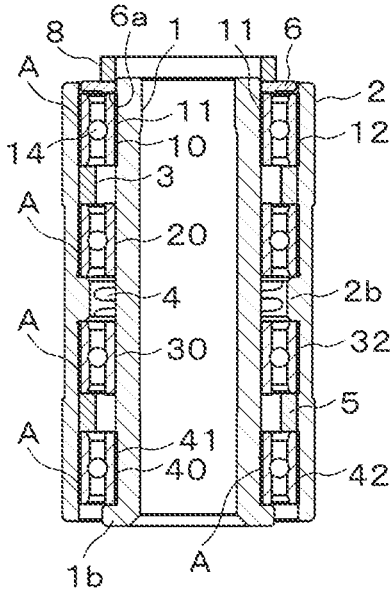

The sleeve 2 is flipped vertically and the hub cap 6 is inserted into a gap between the shaft 1 and the sleeve 2 (see FIG. 5J), and the hub cap 6 is pressed by a pre-load jig 8 (see FIG. 5K). This causes the boss 6a of the hub cap 6 to bias the inner ring 11 of the first bearing 10 downward.

As a result, the inner ring 11 is shifted downward with respect to the outer ring 12 of the first bearing 10, and a pre-load is applied to the first bearing 10. Furthermore, a pressing force of the hub cap 6 is transmitted through the inner ring 11 and the balls 14 to press the outer ring 12 of the first bearing 10 downward. As a result, a force directed downward of the outer ring 12 in the axial direction is transmitted from the outer ring 12 to the spacer 3, the outer ring 22 of the second bearing 20, the step portion 2b of the sleeve 2, the outer ring 32 of the third bearing 30, the spacer 5, and the outer ring 42 of the fourth bearing 40, in this order, so that the outer ring 42 moves downward in the axial direction with respect to the inner ring 41. Consequently, a pre-load is applied to the fourth bearing 40.

When a state where the pre-load is applied to the first and fourth bearings 10, 40 is held until the adhesive A is cured, pre-load application is completed. The adhesive A applied to the inner ring 11 is pushed out when the shaft 1 is inserted into the first bearing 10, and thus the hub cap 6 is bonded to the outer circumferential surface of the shaft 1 by the adhesive A having been pushed out. Furthermore, the hub cap 7 on the opposite side to the hub cap 6 is adhered to the inner circumferential surface of the sleeve 2 with an appropriate adhesive so as to mostly fill the gap between the flange 1b of the shaft 1 and the sleeve 2. It is also possible to provide a function to prevent grease leakage without providing the hub cap 7. In this case, an outer diameter of the flange 1b of the shaft 1 is set to be approximately equal to or greater than an inner diameter of the outer ring 42 of the fourth bearing 40.

According to the above steps, the second and third bearings 20, 30 are pre-loaded with a constant pressure due to the elastic force of the compression spring 4, and the first and fourth bearings 10, 40 are pre-loaded with a constant pressure set by a pressing amount of the pre-load jig 8. As described above, when the elastic force and the pressing amount are appropriately set, it is possible to make the pre-load of all the bearings 10 to 40 uniform.

5. Effect

In the pivot assembly bearing device 100 having the above-described configuration, it is possible to increase the radial rigidity due to the first to fourth bearings 10 to 40, as well as to apply a uniform pre-load to the first to fourth bearings 10 to 40, so that torque variation can be suppressed to further improve positioning accuracy.

Furthermore, in the swing arm assembly 200 using the pivot assembly bearing device 100 having the above-described configuration, the pivot assembly bearing device 100 has a configuration unlikely to generate a torque variation, and, in addition, the structure for attaching the pivot assembly bearing device 100 to the arm 210 also has a configuration unlikely to generate torque variation, so that it is possible to further improve the accuracy of positioning the arm 210.

6. Modification Examples

The present disclosure is not limited to the embodiment described above, and it is possible to make various modifications as described below.

(1) The gap 21a between the inner ring 21 of the second bearing 20 and the outer circumferential surface of the shaft 1 or the gap 31a between the inner ring 31 of the third bearing 30 and the outer circumferential surface of the shaft 1 can be filled with a sealing member. This suppresses micro-vibration of the inner rings 21, 31 not fixed, so that it is possible to suppress occurrence of wear and/or noise caused by friction with the shaft 1. In a case of filling the gap 21a, the sealing member is applied to the outer circumferential surface of the shaft 1 in the vicinity of an axial position P facing the inner circumferential surface of the inner ring 21 of the second bearing 20 after assembly, in a state illustrated in FIG. 5H. In a case of filling the gap 31a, the sealing member is applied to the outer circumferential surface of the shaft 1 in the vicinity of an axial position Q facing the inner circumferential surface of the inner ring 31 of the third bearing 30. In a case of filling one of the gap 21a or the gap 31a with the sealing member, it is more preferable to fill only the gap 31a with the sealing member. In a case of filling only the gap 31a with the sealing member, a state where no sealing member is present in the gap 21a can be made. In a case of filling the gap 21a with the sealing member, the sealing member adheres to the inner circumferential surface of the inner ring 31 of the third bearing 30 when the shaft 1 is inserted, and it is thus not possible to make a state where the gap 31a is completely free of the sealing member.

Note that when the gap 21a is filled with the sealing member, the sealing member cannot be applied to the inner circumferential surface R of the inner ring 21 of the second bearing 20. Otherwise, the sealing member, which is an elastic adhesive, adheres to the tip side of the shaft 1, and is mixed with the adhesive A impairing the function of the adhesive A, the adhesive A being a hard adhesive applied to the inner circumferential surface R of the inner ring 11 of the first bearing 10.

(2) The sealing member is an elastic adhesive having a hardness set to Shore A 70 or less, preferably Shore A 60 or less, more preferably Shore A 50 or less. As a result, when a load of a rotational torque variation is applied, even if the sealing member is interposed in the gap 21a between the inner ring 21 of the second bearing 20 and the outer circumferential surface of the shaft 1 or the gap 31a between the inner ring 31 of the third bearing 30 and the outer circumferential surface of the shaft 1, the inner rings 21, 31 can slightly move to suppress rotational torque variation.

(3) In the above-described embodiment, the sleeve 2 is first inserted onto the first bearing 10 of the first and fourth bearings 10, 40 at both ends (see FIG. 4E), but the shaft 1 holding the fourth bearing 40 may be inserted into the third and second bearings 30, 20, and then the sleeve 2 may be inserted onto the first bearing 10 to make the state illustrated in FIG. 5I.

(4) The present disclosure is not limited to the pivot assembly bearing device 100 as the above-described embodiment, and can be applied to any bearing device.

EXAMPLES

Next, the effects of the present disclosure will be described in more detail by using specific examples.

(1) Sample Preparation i) Invention Example 1

In the pivot assembly bearing device illustrated in FIG. 1, an example of the gap between the inner ring 21 of the second bearing 20 and the outer circumferential surface of the shaft 1 being denoted as P21, the gap between the inner ring 31 of the third bearing 30 and the shaft 1 being denoted as P31, nothing being provided in the gap P21 and the gap P31, and all the other portions of the first to fourth bearings 10 to 40 being caused to adhere to the shaft 1 or the sleeve 2 with a hard adhesive was used as "Invention Example 1".

ii) Invention Example 2

An example of nothing being provided in the gap P21 and an elastic adhesive being provided in P31 to adhere the inner ring 31 of the third bearing and the outer circumferential surface of the shaft 1 to each other was used as "Invention Example 2".

iii) Comparative Example

An example of nothing being provided in the gap P21, and a hard adhesive being provided in P31 to adhere the inner ring 31 of the third bearing and the outer circumferential surface of the shaft 1 to each other was used as "Comparative Example".

iv) Conventional Example

An example of all the inner rings and the outer rings of the first to fourth bearings 10 to 40 being adhered to the shaft 1 or the sleeve 2 using a hard adhesive was used as "Conventional Example".

(2) Measurement of Resonance Frequency

Vibration of each of the samples was detected using a laser Doppler vibrometer (IVS-200, available from Polytec GmbH). The vibration direction was set to the radial direction and the axial direction, and a peak value of detected vibration was taken as a resonance frequency. The above measurement results are shown in Table 1.

(3) Measurement of Rotational Torque

A rotational torque of each of the samples was measured using a rotational torque meter (M15, available from MRI). As the rotational torque, a maximum value and a minimum value, and their difference and average when the shaft 1 was rotated one revolution are shown in Table 1. In addition, variation of the rotational torque from the start of rotation to completion of one revolution is shown in FIGS. 6 to 9.

TABLE 1

| Classification | P21 | P31 | Rotational torque (g·cm) | | | | Resonance frequency (kHz) | |
| | | | Max | Min | Difference | Average | Radial direction | Axial direction |
| --- | --- | --- | --- | --- | --- | --- | --- | --- |
| Invention Example 1 | Absence | Absence | 4.30 | 3.80 | 0.50 | 4.02 | 13.856 | 9.176 |
| Invention Example 2 | Absence | Soft | 4.10 | 3.59 | 0.51 | 3.91 | 13.837 | 9.293 |
| Comparative Example | Absence | Hard | 5.64 | 2.58 | 3.06 | 4.06 | 13.765 | 9.345 |
| Conventional Example | Hard | Hard | 7.70 | 1.50 | 6.20 | 3.98 | 13.959 | 9.297 |

(4) Measurement Results

As shown in Table 1, Conventional Example has the highest resonance frequency in the radial direction. This indicates the highest radial rigidity. The resonance frequencies in the radial direction of Invention Examples 1, 2 and Comparative Example were comparable to that of Conventional Example, and it was confirmed that a sufficient radial rigidity was obtained.

Figure 6:
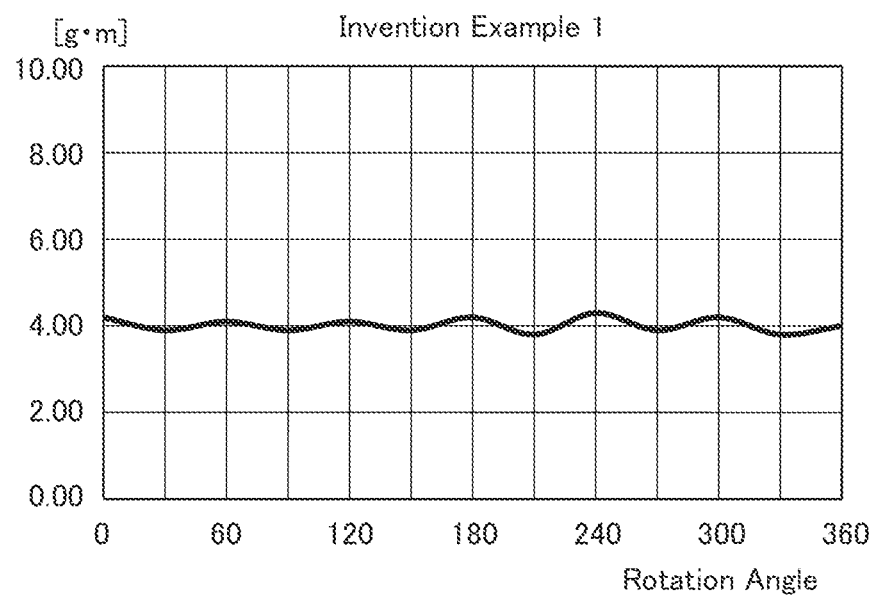
FIG. 6 is a graph showing a relationship between rotation angle and torque in a pivot assembly bearing device of an example of the present disclosure.
Figure 7:
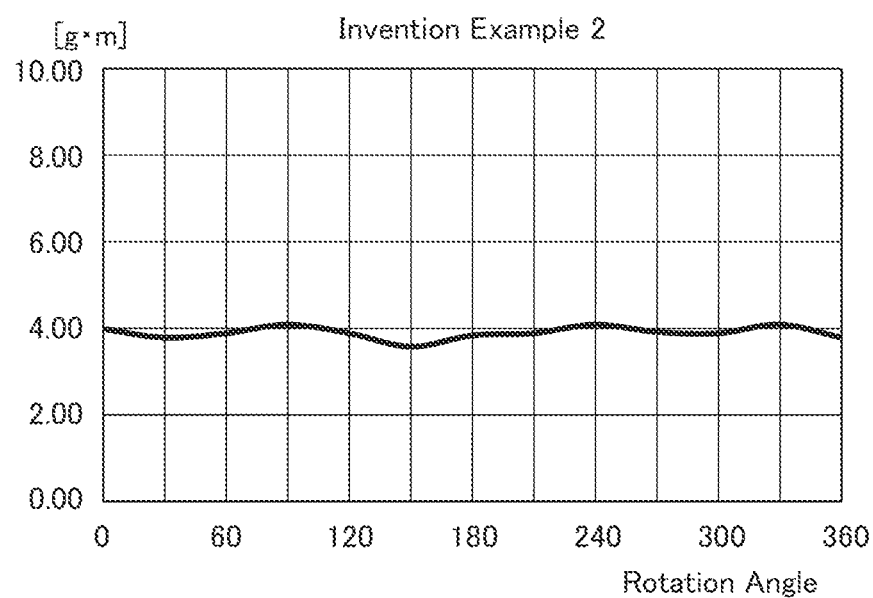
FIG. 7 is a graph showing a relationship between rotation angle and torque in a pivot assembly bearing device according to another example of the present disclosure.

The difference in rotational torque was 3.06 g·cm in Comparative Example and 6.20 g·cm in Conventional Example, whereas the rotational torque of each of Invention Examples 1, 2 had a difference between the maximum and the minimum of approximately 0.50 g·cm. In this way, in Invention Examples 1, 2, it was confirmed that variation of the rotational torque was greatly reduced. FIG. 6 illustrates a change in the rotational torque of Invention Example 1, and FIG. 7 illustrates a change in the rotational torque of Invention Example 2. As shown in these figures, there was almost no difference in change in the rotational torque in Invention Examples 1 and 2.

Figure 8:
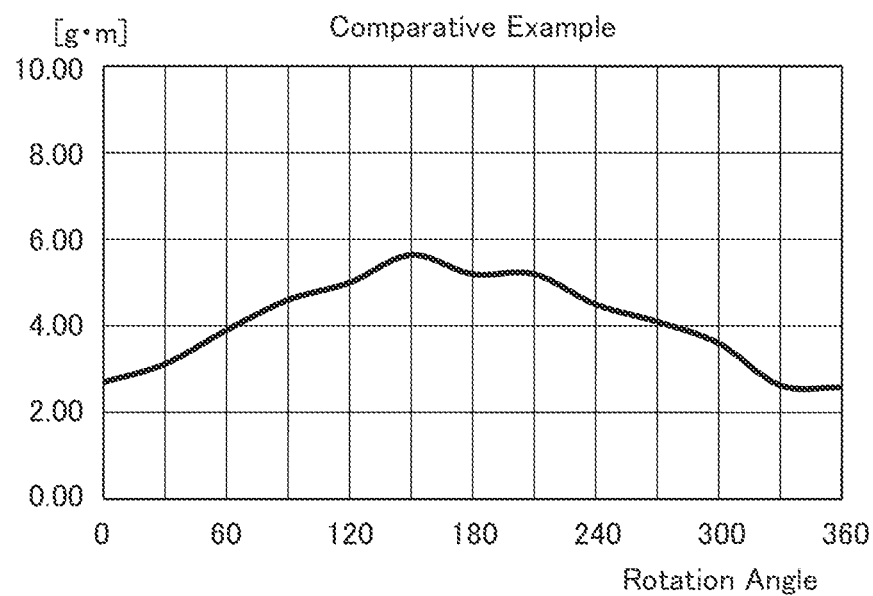
FIG. 8 is a graph showing a relationship between rotation angle and torque in a pivot assembly bearing device of Comparative Example.
Figure 9:
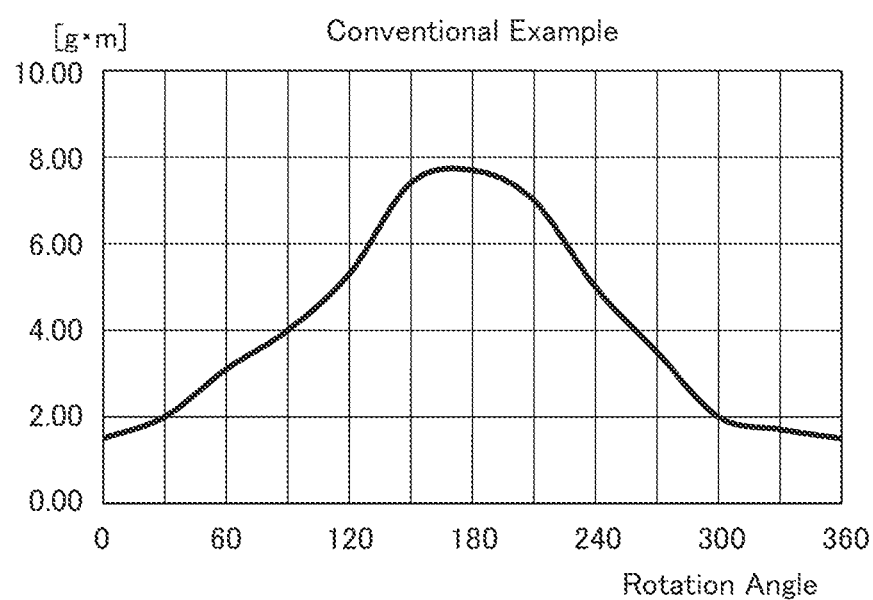
FIG. 9 is a graph showing the relationship between rotation angle and torque in a pivot assembly bearing device in the related art.

In contrast, in Comparative Example and Conventional Example, as illustrated in FIGS. 8 and 9, the rotational torque gradually increased from the start of rotation of the shaft 1, and a large peak of the rotational torque appeared around half rotation. From the above results, it was confirmed that the rotational torque variation was suppressed and positioning accuracy was improved in the present disclosure.

The present disclosure can be used in various types of bearing devices such as a pivot assembly bearing device, a swing arm assembly using this bearing device, and a hard disk drive device.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A bearing device comprising:
an outer member having a tubular shape;
a shaft member held inside the outer member; and
a first bearing, a second bearing, a third bearing, and a fourth bearing, rotatably holding the shaft member with respect to the outer member and arranged in this order in an axial direction, wherein
an outer circumferential surface of an outer ring of each of the first bearing, the second bearing, the third bearing, and the fourth bearing is fixed to an inner circumferential surface of the outer member, and
a spring applying a constant pre-load is provided between inner rings of the second bearing and the third bearing.

2. The bearing device according to claim 1, wherein the outer circumferential surface of the outer ring of each of the first bearing, the second bearing, the third bearing, and the fourth bearing is adhered to the inner circumferential surface of the outer member with an adhesive.

3. The bearing device according to claim 2, wherein the adhesive is an anaerobic adhesive.

4. The bearing device according to claim 1, wherein a step portion protruding inward in a radial direction is formed in a central portion of the inner circumferential surface of the outer member, and
an outer ring of each of the second bearing and the third bearing is in contact with the step portion.

5. The bearing device according to claim 4, wherein the spring is disposed inside the step portion of the outer member.

6. The bearing device according to claim 1, wherein a sealing member is provided between the shaft member and at least one of the inner rings of the second bearing and the third bearing.

7. The bearing device according to claim 6, wherein the sealing member is an elastic adhesive.

8. The bearing device according to claim 7, wherein the sealing member is provided between an inner ring of the third bearing and the shaft member, and
no sealing member is provided between an inner ring of the second bearing and the shaft member.

9. The bearing device according to claim 7, wherein the elastic adhesive has a hardness set to Shore A 70 or less.

10. The bearing device according to claim 9, wherein the elastic adhesive has the hardness set to Shore A 60 or less.

11. The bearing device according to claim 10, wherein the elastic adhesive has the hardness set to Shore A 50 or less.

12. The bearing device according to claim 1, wherein the spring is a compression spring.

13. The bearing device according to claim 12, wherein the compression spring is selected from a compression coil spring, a coiled wave spring, and a wave washer.

14. A hard disk drive device comprising:
the bearing device described in claim 1;
a swing arm swingably supported by the bearing device and configured to move a magnetic head on a magnetic disk; and
a base plate to which the shaft member of the bearing device is fixed.

15. The hard disk drive device according to claim 14, wherein a step portion protruding inward in a radial direction is formed in a central portion of the inner circumferential surface of the outer member,
a through hole into which the bearing device is fitted is provided in a shaft portion of the swing arm,
a screw hole reaching the through hole is provided in the shaft portion of the swing arm,
in a state where the bearing device is fitted into the through hole of the swing arm, a screw is threaded into the screw hole and tightened to attach the swing arm to the bearing device,
a tip of the screw contacts with the bearing device, and
a contact position of the screw with the bearing device is the step portion.

16. A method for producing a bearing device including a shaft member rotatably held inside an outer member having a tubular shape via a first bearing, a second bearing, a third bearing, and a fourth bearing, the method comprising:
inserting the third bearing into the outer member to adhere an outer ring of the third bearing to an inner circumferential surface of the outer member;
inserting a spring into the outer member to bring an end surface of the spring into contact with an inner ring of the third bearing directly or via a washer;
inserting the second bearing into the outer member, pressing an inner ring of the second bearing against the spring, and adhering an outer ring of the second bearing to the inner circumferential surface of the outer member;
inserting the first bearing into the outer member and adhering an outer ring of the first bearing to the inner circumferential surface of the outer member;
adhering an inner ring of the fourth bearing to an outer circumferential surface of the shaft member; and
inserting the shaft member into the inner rings of the first to third bearings, adhering an outer ring of the fourth bearing to the inner circumferential surface of the outer member, and adhering the inner ring of the first bearing to the outer circumferential surface of the shaft member.

17. A method for producing a bearing device including a shaft member rotatably held inside an outer member having a tubular shape via a first bearing, a second bearing, a third bearing, and a fourth bearing, the method comprising:
inserting the third bearing into the outer member to adhere an outer ring of the third bearing to an inner circumferential surface of the outer member;

inserting a spring into the outer member to bring an end surface of the spring into contact with an inner ring of the third bearing directly or via a washer;

inserting the second bearing into the outer member, pressing an inner ring of the second bearing against the spring, and adhering an outer ring of the second bearing to the inner circumferential surface of the outer member;

adhering an inner ring of the fourth bearing to an outer circumferential surface of the shaft member;

inserting the shaft member into the inner rings of the second bearing and the third bearing, adhering an outer ring of the fourth bearing to the inner circumferential surface of the outer member; and inserting the first bearing into the outer member and onto the shaft member, adhering an outer ring of the first bearing to the inner circumferential surface of the outer member and adhering the inner ring of the first bearing to the outer circumferential surface of the shaft member.

18. The method for producing a bearing device according to claim 16, further comprising:

adhering at least one of the inner rings of the second bearing and the third bearing to the outer circumferential surface of the shaft member with an elastic adhesive.

19. The method for producing a bearing device according to claim 17, further comprising:

adhering at least one of the inner rings of the second bearing and the third bearing to the outer circumferential surface of the shaft member with an elastic adhesive.

\* \* \* \* \*